US007565734B2

(12) United States Patent
Link et al.

(10) Patent No.: US 7,565,734 B2

(45) Date of Patent: Jul. 28, 2009

(54) REPLACEABLE INDUCTION FORGING COIL

(75) Inventors: Jason D. Link, 9065 E. Bristol Rd., Davison, MI (US) 48423; James Link, Davison, MI (US)

(73) Assignee: Jason D. Link, Davison, MI (US)

( * ) Notice: Subject to any disclaimer, the term of this patent is extended or adjusted under 35 U.S.C. 154(b) by 282 days.

(21) Appl. No.: 11/562,321

(22) Filed: Nov. 21, 2006

(65) Prior Publication Data

US 2007/0113397 A1 May 24, 2007

Related U.S. Application Data

(60) Provisional application No. 60/597,306, filed on Nov. 22, 2005.

(51) Int. Cl.
*B23P 19/00* (2006.01)
*B23K 9/18* (2006.01)

(52) U.S. Cl. ............................ 29/745; 29/606; 29/742; 29/755; 29/758; 219/86.23

(58) Field of Classification Search .................. 29/745, 29/742, 755, 575, 758; 219/86.23, 86.24, 219/91.2, 91.21, 117.1, 10.69, 654; 439/484
See application file for complete search history.

(56) References Cited

U.S. PATENT DOCUMENTS 4,017,703 A * 4/1977 Lavins et al. ................ 219/655
4,051,590 A 10/1977 Halter et al.
4,180,257 A * 12/1979 Buccicone .................. 271/193
4,859,823 A * 8/1989 Faber ......................... 219/654
5,900,081 A 5/1999 Chen
6,178,800 B1 1/2001 Edmonds et al.

OTHER PUBLICATIONS

Radyne Corporation; 2-page article entitled "Coil Design" at www.radyne.com/coil.htm; Feb. 16, 2005.
Heating Induction Services, Inc.; 2-page article entitled "Coils" at www.heatinginduction.com/coils/index.html; Feb. 16, 2005.
Capital Induction; 1-page article entitled "Forge Coils" at www.capitalinduction.com/forge.htm; Feb. 16, 2005.

* cited by examiner

*Primary Examiner*—David P Bryant
*Assistant Examiner*—Tai Nguyen
(74) *Attorney, Agent, or Firm*—Weiner & Burt, P.C.; Irving M. Weiner; Pamela S. Burt

(57) ABSTRACT

An induction forging coil apparatus which makes induction forge coils easier and faster to change on a forge-line. The coil insert is a separate independent unit by itself which slides into the frame to connect to the frame via bus connections and other components. The coil insert is attached to the frame (another separate independent unit by itself) to complete the overall induction heating coil. The induction coil (with both units attached and operatively interconnected) can run on the forge line until it blows/fails, and instead of pulling the whole induction coil (both units attached) off-line to be rebuilt; the frame can be left on-line (or pulled off-line for a brief period of time if there is not enough room to reach the components due to the particular forge-line setup) to switch the failed insert with a new or rebuilt insert, by disconnecting the failed coil insert from the frame and then reconnecting the frame with the new or rebuilt coil insert.

17 Claims, 2 Drawing Sheets

FIG. 1
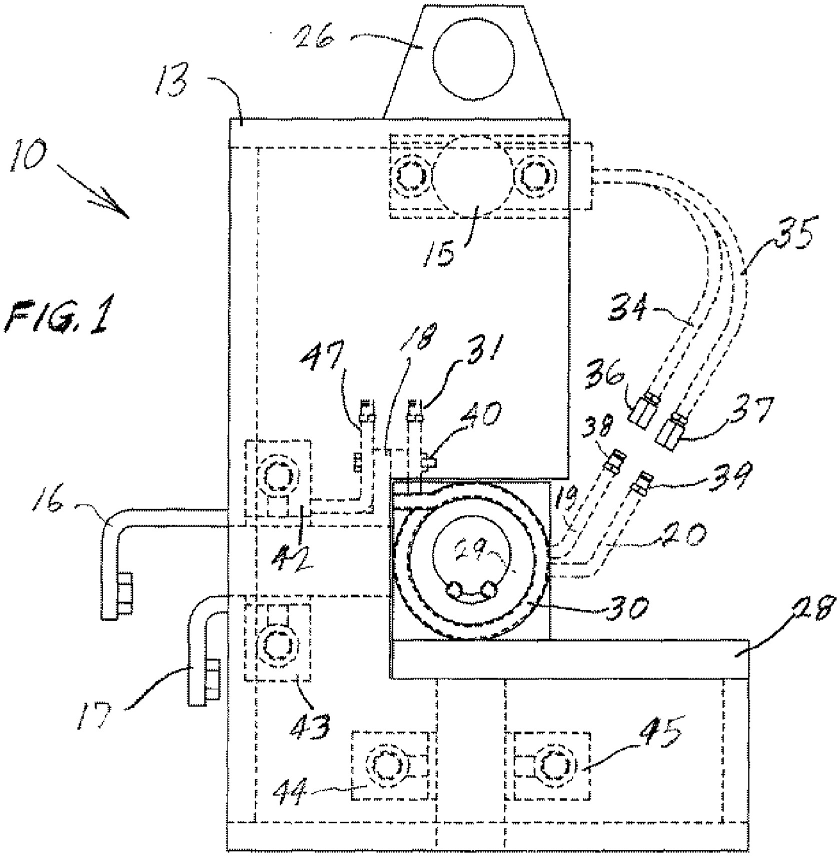
FIG. 3
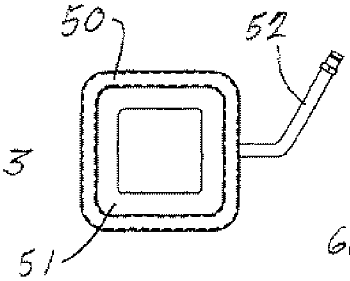
FIG. 4
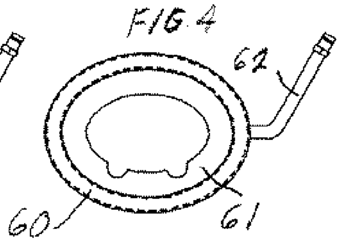
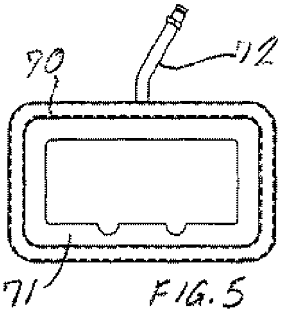
FIG. 5
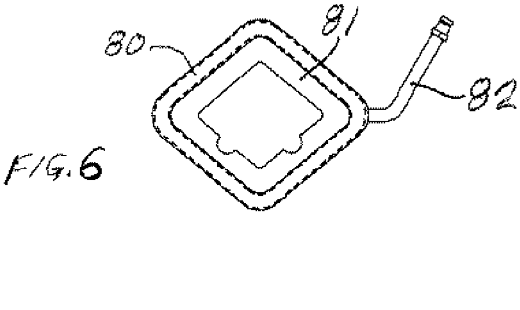
FIG. 6

REPLACEABLE INDUCTION FORGING COIL

CROSS-REFERENCE TO RELATED APPLICATIONS

The present application is a continuation-in-part of and claims priority from U.S. Provisional Patent Application Ser. No. 60/597,306 filed Nov. 22, 2005.

STATEMENT REGARDING FEDERALLY SPONSERED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to replaceable induction forge coils, and methods of constructing and utilizing same.

More particularly, the present invention relates to replaceable induction forge coils, and methods to make induction forge coils easier and faster to change on forge lines.

BACKGROUND OF THE INVENTION

The prior, but not necessarily relevant, art is exemplified by Halter et al. U.S. Pat. No. 4,051,590; Chen U.S. Pat. No. 5,900,081; and Edmonds et al. U.S. Pat. No. 6,178,800.

It is a desideratum of the present invention to avoid the animadversions of the conventional and prior art devices and techniques, and to attain replaceable induction forge coils which make it easier and faster to change on forge-lines.

SUMMARY OF THE INVENTION

The present invention provides an induction forging coil apparatus which makes induction forge coils easier and faster to change on a forge-line, comprising: two independent units comprising a first unit and a second unit; said first unit comprising a frame assembly; said second unit comprising a coil insert assembly; said frame assembly being constructed to supply electricity and water to said coil insert assembly when hooked up to said forge-line; said frame assembly being constructed and dimensioned to accommodate various sizes and/or shapes of said coil insert assembly; and said frame assembly and said coil insert assembly being constructed such that when said coil insert assembly fails to operate properly, said frame assembly can be left on-line and said failed coil insert assembly can be removed and replaced with a new or rebuilt coil insert assembly, or said frame assembly can be briefly pulled off-line to accomplish replacement of said coil insert assembly if there is insufficient space to accomplish replacement of said coil insert assembly while on-line due to the forge-line setup.

A primary object of the present invention is to make induction forge coils easier and faster to change on forge lines, and methods of constructing and utilizing same.

Another object of the present invention is to make forge coil frames able to accommodate various size coils.

A further object of the present invention is to separate the coil frame and the coil into different units.

Yet another object of the present invention is to provide a forging coil assembly made of two independent units, wherein the first unit is the frame, and the second unit is the coil insert which is able to insert into and connect to the frame horizontally, vertically, diagonally, all of the aforementioned orientations, and/or at any angle from 0 degrees to 360 degrees.

Another object of the present invention is to provide a novel coil insert which is a separate unit by itself, and which slides into the frame and is connected to the frame by means of bus connections.

A further object of the present invention is to provide a novel coil insert which is attached to the frame to complete the induction heating coil.

Another object of the present invention is to provide a system where the induction coil (both units attached) can run on the forge line until it blows or fails, and instead of pulling the whole induction coil (both units attached) off the line to be rebuilt, the coil frame can be left on-line (or pulled off-line for a brief period where there is not enough room due to the forge line set-up) and just switch the failed coil insert with anew or rebuilt coil insert by means of disconnecting the failed coil insert from the frame and reconnecting the frame with the new or rebuilt coil insert.

The foregoing objects, advantages and features of the present invention will become more apparent to those persons skilled in this particular area of technology and to other persons after having been exposed to the following detailed description when read in conjunction with the accompanying patent drawings.

BRIEF DESCRIPTION OF THE DRAWINGS

FIG. 1 illustrates an end elevational view of a preferred embodiment of the present invention.

FIG. 3 depicts a square-shaped coil insert.

FIG. 4 shows an elliptical-shaped coil insert.

FIG. 5 illustrates a rectangular-shaped coil insert.

FIG. 6 illustrates a diamond-shaped coil insert.

DETAILED DESCRIPTION OF THE INVENTION

Figure 2:
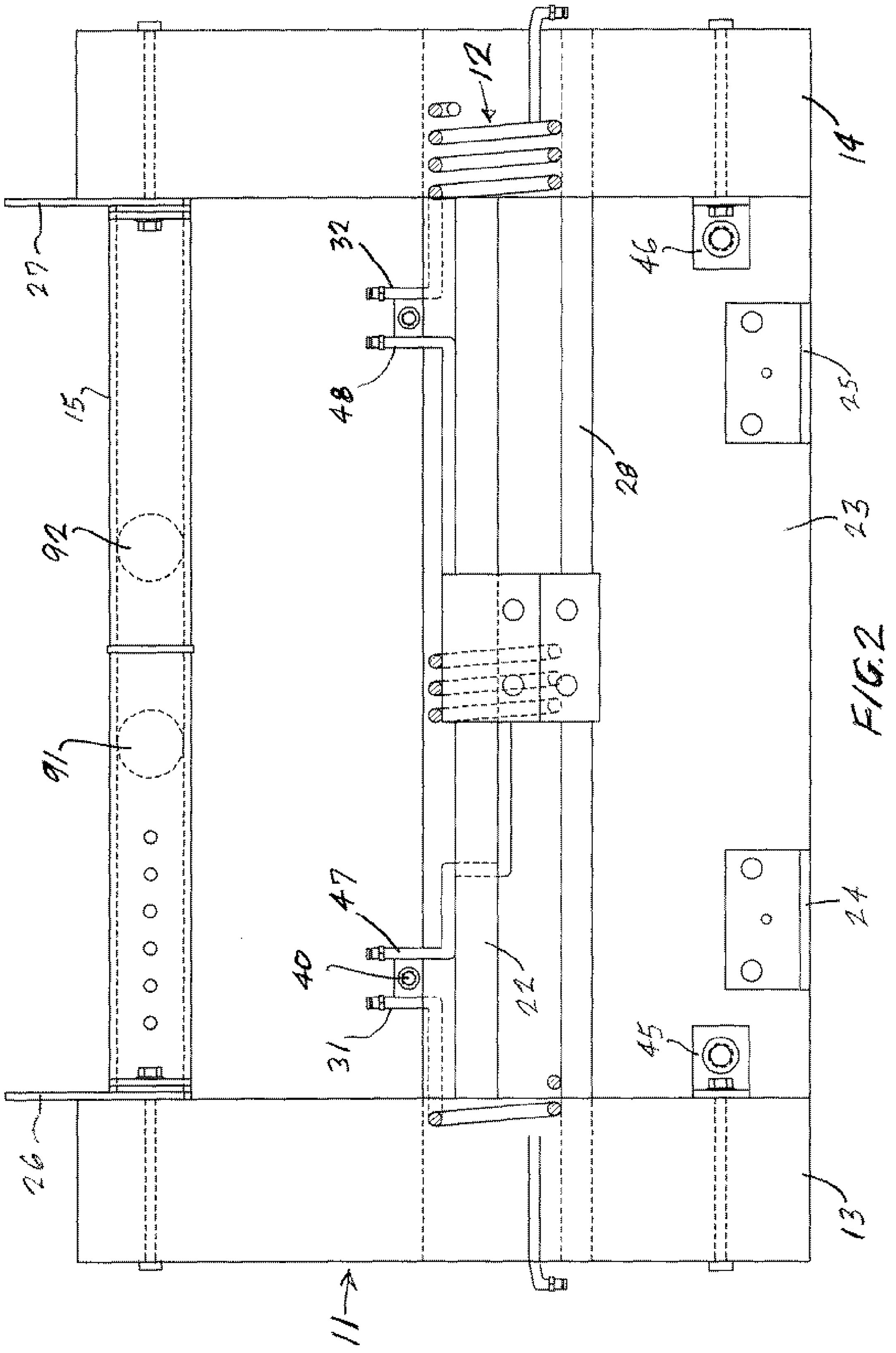
FIG. 2 illustrates a front elevational view of the FIG. 1 embodiment.

With reference to FIGS. 1 and 2, there is shown the novel forging coil assembly 10 in accordance with a preferred embodiment of the present invention.

The forging coil assembly 10 consists of two independent units 11 and 12.

The first unit is the frame 11 which consists of two refractory end boards 13 and 14, a manifold 15 with water inlet and outlet nipples 91 and 92 and multiple quick-disconnects 36 and 37 (for example), two support boards 22 and 23, two locator pads 24 and 25, clip angle support brackets 42, 43, 44, 45 and 46, two lifting lugs 26 and 27, and copper bus assemblies 16 and 17 which coincide with bus works 47 and 48 for the bus assembly.

The frame 11 is constructed to accommodate various sized coil inserts 12 and will also supply electricity and water to the coil inserts 12 only when hooked up to a forge line.

The second unit would be the coil inserts 12 which consist of a G-10 bottom board 28, refractory 29, and the coil winding 30 itself made of copper tubing with bus leads 31 and 32 that connects the coil insert 12 to the busworks 47 and 48 on the frame 11.

The coil insert 12 is also provided with ports 19 and 20 and quick-disconnects 38 and 39 on the coil 30 itself or on a manifold attached to the coil insert 12 to receive and return water from the frame manifold 15.

The coil insert 12 is a separate unit by itself which slides into the frame 11 horizontally, vertically, diagonally, at all of the aforementioned orientations, and/or at any angle from 0 degrees to 360 degrees to connect to the frame 11 by means of the bus connections and/or retaining brackets, clips, plugs, fasteners, rings, etc.

The coil insert 12 is attached to the frame 11 to complete the induction heating coil assembly 10.

An important feature of the present invention is that the induction coil 12 can run on the forge line until it fails.

Upon failure, instead of pulling the induction coil 12 with both units 11 and 12 attached off-line to be rebuilt, it is possible to leave the coil frame 11 on-line and just replace the failed coil insert 12 with a new or rebuilt coil insert.

The new or rebuilt coil insert may be attached by means of disconnecting the failed coil insert from the frame 11, and then reconnecting the frame 11 with the new or rebuilt coil insert.

Alternatively, when the coil 12 fails, the coil frame 11 can be pulled off-line for a brief time if there is not enough room to reach the components due to the forge line set-up.

FIGS. 1 and 2 show how water to cool the coil insert 12 is supplied by, for example, hoses 34 and 35 from the manifold 15 with quick-disconnect sockets 36 and 37 which attach to quick-disconnect plugs 38 and 39, respectively, on the coil insert 12. There are multiple hoses and quick-disconnects, but only the afore-identified ones have been shown for purposes of drawing clarity.

The clip angles 42, 43, 44, 45 and 46 fasten the support boards 22 and 23 to the end boards 13 and 14.

Bolt 40 are used to fasten the busworks 31, 32 and 47, 48 at the power transfers 18.

The coil shape and cast shape can vary. Some variations from the circular coil insert 12 shape are shown in FIGS. 3-6, wherein only one of several ports is shown for purposes of drawing clarity.

FIG. 3 shows a square-shaped coil 50 with a cast shape refractory 51 to accommodate such coil 50 with an appropriate port 52 for the coil.

Similarly, FIG. 4 shows an oval-shaped coil 60 with an appropriate cast shape refractory 61, and its port 62.

FIG. 5 shows a rectangular-shaped coil 70 with an appropriate cast insert refractory 71, and its port 72.

FIG. 6 shows a diamond-shaped coil 80 with its appropriate cast shape refractory 81, and its appropriate port 32.

It is important to note that the coil insert 12, 50, 60, 70 or 80, at the time of installation is fully functional. The frame 11 holds the coil insert 12, 50, 60, 70 or 80, in place, and provides water and power to the coil insert 12, 50 60, 70 or 80.

The frame 11 and the coil 12 insert have different functions, and a main concept of the present invention is to separate a coil frame 11 from its coil insert 12.

It should be noted that the bolt 40 fastened to the busworks 36 and 37 is where the coil insert 12 connects to the frame 11.

The present invention embraces the concept of the insert coil 12 to be connected to the manifold 15 by quick-disconnect couplers either on the insert manifold, or quick-disconnects directly mounted on the insert coil 12.

A coil 30 is the primary heating element of the unit 10, and is part of the insert 12, and is not part of the frame 11.

The electrical bus assemblies 16 and 17 are connectible, for example, by bolting, directly to a power supply (not shown).

The flags or copper leads in accordance with the present invention will bolt to the coil insert 12 and allow the coil insert 12 itself to be removable from the frame 11.

One aspect of the invention is that the insert is fully-functional even before it is inserted in the rest of the apparatus.

In accordance with the present invention, it is important to note that the coil insert is a separate independent unit by itself which slides into the frame to connect to the frame by means of the bus connections and other components. The coil insert is attached to the frame (which again is another separate independent unit by itself) to complete the induction heating coil. The main concept is that the induction coil (with both units attached and operatively interconnected) can run on the forge line until it blows/fails, and instead of pulling the whole induction coil (both units attached) off line to be rebuilt; the frame can be left on-line (or pulled it off for a brief period of time if there's not enough room to reach the components due to the forge-line setup) and merely switch the failed insert with a new or rebuilt insert, by means of disconnecting the failed coil insert from the frame and reconnecting the frame with the new or rebuilt coil insert.

There has been illustrated in the accompanying drawings and described hereinabove several unique and novel embodiments of the present invention which can be practiced and constructed in many different configurations, arrangements of components, sizes, and shapes.

It should be understood that many changes, modifications, variations, and other uses and applications will become apparent to those persons skilled in this particular area of technology and to other persons after having been exposed to the present patent specification and accompanying patent drawings Any and all such changes, modifications, variations and other uses and applications which do not depart from the spirit and scope of the present invention are therefore covered by and embraced within the present invention and the patent claims set forth hereinbelow.

The invention claimed is:

1. An induction forging coil apparatus which makes induction forge coils easier and faster to change on a forge-line, comprising:

two independent units comprising a first unit and a second unit;

said first unit comprising a frame assembly;

said second unit comprising a coil insert assembly;

said frame assembly being constructed to supply electricity and water to said coil insert assembly when hooked up to said forge-line;

said frame assembly being constructed and dimensioned to accommodate various sizes and/or shapes of said coil insert assembly;

said frame assembly and said coil insert assembly being constructed such that when said coil insert assembly fails to operate properly, said frame assembly can be left on-line and said failed coil insert assembly can be removed and replaced with a new or rebuilt coil insert assembly, or said frame assembly can be briefly pulled off-line to accomplish replacement of said coil insert assembly if there is insufficient space to accomplish replacement of said coil insert assembly while on-line due to the forge line setup; and said first unit comprises said frame assembly which includes two refractory end boards, a manifold with quick-disconnect devices, two support boards, two locator pads, clip-angle support brackets, two lifting lugs, and copper bus assemblies.

2. An induction forging coil apparatus according to claim 1, wherein:

said coil insert assembly is constructed and dimensioned to slide into said frame assembly to be operably connected therewith.

3. An induction forging coil apparatus according to claim 2, wherein:

said frame assembly includes buss-work devices; and said second unit comprises said coil insert assembly which includes a bottom board and a coil winding made of copper tubing with buss-leads which connect said coin insert assembly to said buss-work devices of said frame assembly.

4. An induction forging coil apparatus according to claim 3, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

5. An induction forging coil apparatus according to claim 2, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

6. An induction forging coil apparatus according to claim 1, wherein:

said frame assembly includes buss-work devices; and said second unit comprises said coil insert assembly which includes a bottom board and a coil winding made of copper tubing with buss-leads which connect said coin insert assembly to said buss-work devices of said frame assembly.

7. An induction forging coil apparatus according to claim 6, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

8. An induction forging coil apparatus according to claim 1, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

9. An induction forging coil apparatus according to claim 1, wherein:

said coil insert assembly is a separate unit by itself which slides into said frame assembly to connect with said frame assembly by means of bus connections or retaining brackets, clips, plugs, fasteners, or rings.

10. An induction forging coil apparatus which makes induction forge coils easier and faster to change on a forge-line, comprising:

two independent units comprising a first unit and a second unit;

said first unit comprising a frame assembly;

said second unit comprising a coil insert assembly;

said frame assembly being constructed to supply electricity and water to said coil insert assembly when hooked up to said forge-line;

said frame assembly being constructed and dimensioned to accommodate various sizes and/or shapes of said coil insert assembly;

said frame assembly and said coil insert assembly being constructed such that when said coil insert assembly fails to operate properly, said frame assembly can be left on-line and said failed coil insert assembly can be removed and replaced with a new or rebuilt coil insert assembly, or said frame assembly can be briefly pulled off-line to accomplish replacement of said coil insert assembly if there is insufficient space to accomplish replacement of said coil insert assembly while on-line due to the forge line setup;

said frame assembly includes buss-work devices; and said second unit comprises said coil insert assembly which includes a bottom board and a coil winding made of copper tubing with buss-leads which connect said coin insert assembly to said buss-work devices of said frame assembly.

11. An induction forging coil apparatus according to claim 10, wherein:

said coil insert assembly is constructed and dimensioned to slide into said frame assembly to be operably connected therewith.

12. An induction forging coil apparatus according to claim 11, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

13. An induction forging coil apparatus according to claim 10, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

14. An induction forging coil apparatus according to claim 10, wherein:

said coil insert assembly is a separate unit by itself which slides into said frame assembly to connect with said frame assembly by means of bus connections or retaining brackets, clips, plugs, fasteners, or rings.

15. An induction forging coil apparatus which makes induction forge coils easier and faster to change on a forge-line, comprising:

two independent units comprising a first unit and a second unit;

said first unit comprising a frame assembly;

said second unit comprising a coil insert assembly;

said frame assembly being constructed to supply electricity and water to said coil insert assembly when hooked up to said forge-line;

said frame assembly being constructed and dimensioned to accommodate various sizes and/or shapes of said coil insert assembly;

said frame assembly and said coil insert assembly being constructed such that when said coil insert assembly fails to operate properly, said frame assembly can be left on-line and said failed coil insert assembly can be removed and replaced with a new or rebuilt coil insert assembly, or said frame assembly can be briefly pulled off-line to accomplish replacement of said coil insert assembly if there is insufficient space to accomplish replacement of said coil insert assembly while on-line due to the forge line setup;

said coil insert assembly is constructed and dimensioned to slide into said frame assembly to be operably connected therewith; and said coil insert assembly is constructed and dimensioned to be inserted into and connect with said frame assembly horizontally, vertically, diagonally, at any and all of the aforementioned orientations, or at any angle from 0 degrees to 360 degrees.

16. An induction forging coil apparatus which makes induction forge coils easier and faster to change on a forge-line, comprising:

two independent units comprising a first unit and a second unit;

said first unit comprising a frame assembly;

said second unit comprising a coil insert assembly;

said frame assembly being constructed to supply electricity and water to said coil insert assembly when hooked up to said forge-line;

said frame assembly being constructed and dimensioned to accommodate various sizes and/or shapes of said coil insert assembly;

said frame assembly and said coil insert assembly being constructed such that when said coil insert assembly fails to operate properly, said frame assembly can be left on-line and said failed coil insert assembly can be removed and replaced with a new or rebuilt coil insert assembly, or said frame assembly can be briefly pulled off-line to accomplish replacement of said coil insert assembly if there is insufficient space to accomplish replacement of said coil insert assembly while on-line due to the forge line setup; and said coil insert assembly is a separate unit by itself which slides into said frame assembly to connect with said frame assembly by means of bus connections or retaining brackets, clips, plugs, fasteners, or rings.

17. An induction forging coil apparatus according to claim 16, wherein:

said coil insert assembly is constructed and dimensioned to be inserted into and connect with said frame assembly horizontally, vertically, diagonally, at any and all of the aforementioned orientations, or at any angle from 0 degrees to 360 degrees.

* * * * *